June 9, 1936.  J. K. BILDER  2,043,729
DRAFTING INSTRUMENT
Filed June 8, 1932
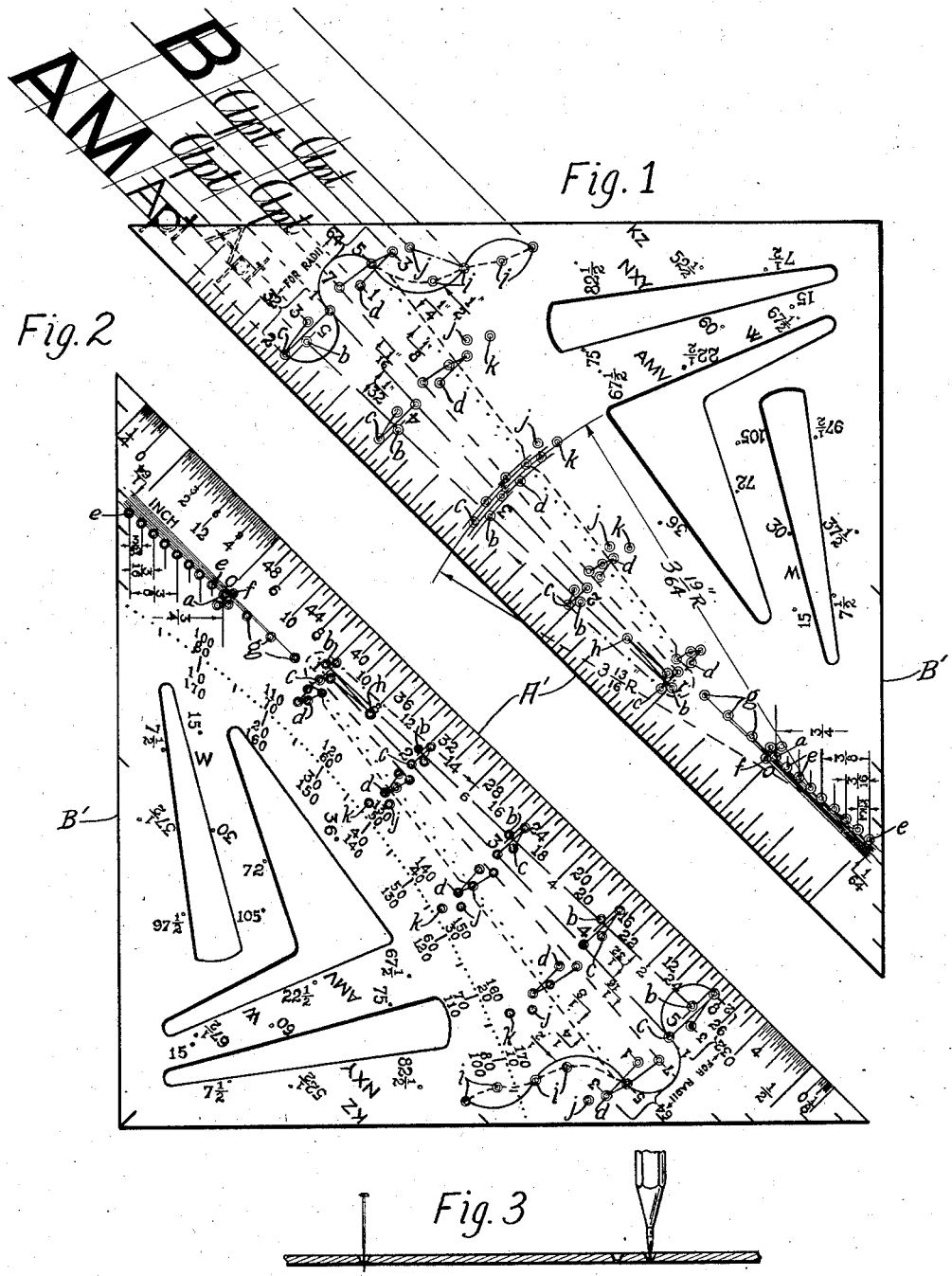
INVENTOR
James K. Bilder
BY
Joseph W. Crockett
HIS ATTORNEY Patented June 9, 1936

2,043,729

UNITED STATES PATENT OFFICE 2,043,729

DRAFTING INSTRUMENT

James K. Bilder, Dayton, Ohio

Application June 8, 1932, Serial No. 615,956

5 Claims. (Cl. 33—104)

This invention relates to drafting instruments and the like, but more particularly to triangles for use by architectural and mechanical draftsmen and commercial artists.

One object of this invention is to provide in one instrument all that is necessary in the way of tools for ordinary problems in drafting and commercial art.

Another object is to supply a drafting instrument that takes the place of compass, scale and protractor, and likewise provides means for making horizontal lines for lettering and various parallel lines of determinable spacing.

Still another object is to furnish means whereby various geometrical figures may be calculated and drawn and to provide means for making various slopes and angular letters.

A further object is to provide a triangle with a plurality of through holes or apertures, arranged in a series of groups which are properly spaced vertically from the hypotenuse of the triangle for obtaining various parallel lines, and said groups of holes, when used in conjunction with a series of center or zero holes, also provide means for obtaining various radii.

With these and incidental objects in view, the invention includes certain novel features of construction, the essential elements of which are set forth in appended claims and a preferred form, or embodiment of which is hereinafter described with reference to the drawing which accompanies and forms a part of this specification.

Of said drawing:

Fig. 1 is a plan view omitting the protractor and illustrates the manner of obtaining various radii. This figure also illustrates how horizontal and sloping guide lines are obtained for lettering.

Fig. 2 is a plan view of the complete triangle.

Fig. 3 is a sectional edge view of the triangle and depicts the use of the device for laying out radii.

Description

A triangle made of pyralin, celluloid or any suitable material is used as a basis for the instrument of the instant invention. While not limiting the invention thereto, still it is preferable to use a forty-five degree, or right-angled triangle for this purpose, as it provides ample space for the various groups of holes and angular openings and is well suited as the basis of a protractor.

A detailed description will first be given of the manner of obtaining various radii. Calling attention to Fig. 1 opposite the "zero" line of the graduated scale is a hole, or aperture ($a$) which is the center hole most commonly used in conjunction with the holes of the different groups for obtaining various radii. Opposite each inch graduation of the scale is a hole ($b$) used in conjunction with the center hole ($a$) for obtaining by one inch steps radii from one to five inches, inclusive.

Around each of the holes ($b$) is a group of three holes ($c$) connected by lines which, when used with the center hole ($a$) gives the even inch radius plus one, two or three thirty-seconds of an inch. For example, the group ($c$) nearest the one inch graduation gives the radii $1\frac{1}{32}$, $1\frac{2}{32}$ and $1\frac{3}{32}$ inches. Considering the hypotenuse ($A'$) of the triangle as the working base of the device, located just above each of the groups ($c$) is a group of four holes ($d$) connected by lines. The holes in the ($d$) groups, while spaced radially $\frac{1}{32}$ of an inch apart from the center hole ($a$) are interspersed equally between the holes in the ($c$) groups so that used in conjunction therewith radii of $\frac{1}{64}$ inch spacing may be obtained.

The connecting lines for the holes in the groups ($c$) and ($d$) at the three inch graduation have been omitted in order to clearly show the method of obtaining various radii. Engraved just to the left of the five inch graduation are the words "for radii" with arrows pointing to the markings "32", opposite the ($c$) groups of holes, and "64" opposite the ($d$) groups of holes, indicating the proper holes to use for obtaining various radii.

Extending to the right of the center hole ($a$) are eight holes ($e$) spaced $\frac{1}{8}$ inch apart which are to be used for securing radii from $\frac{1}{8}$ inch to one inch in $\frac{1}{8}$ inch steps. These holes ($e$) are also to be used as center holes in conjunction with the holes ($b$) and groups ($c$) and ($d$) from one inch to $6\frac{7}{64}$ inches for any radius therebetween, reckoned in fractions of sixty-fourths of an inch.

To illustrate, assume it is desired to draw a $3\frac{13}{32}$ inch radius (Fig. 1), it is readily seen that by using the sixth hole ($e$) to the right of the hole ($a$) as a center and the hole ($b$) opposite the 3 inch graduation, it is possible to approach within $\frac{1}{16}$ or $\frac{2}{32}$ inch of this dimension and by using the $\frac{2}{32}$ hole in the ($c$) group at the 3 inch graduation, the proper radius is obtained.

In obtaining a radius of $3\frac{19}{64}$ inches, first it is determined which of the holes ($e$) is nearest the desired fraction; in this case the second hole to the right of the center hole ($a$). Using the selected hole ($e$) as a center the proper radius is obtained by calculating the remaining fraction of $3\frac{3}{64}$ inches in the holes to the left of center hole (a) and it is readily seen that this would be the 3/64 inch hole in the group (d) at the 3 inch graduation.

Situated around the center hole (a) and spaced in 3/32 inch steps therefrom, is a group of three holes (f) connected by lines; using these holes and the hole (a) in conjunction with the holes (e) as centers, radii of 1/8 inch to 1 3/32 inches in 3/32 inch fractional steps may be obtained.

Summarizing briefly, it will be seen that radii from 1 inch to 6 7/64 inches in 1/64 inch fractional steps may be obtained by using the various combination of holes referred to above, and by using the holes (e) in combination with the holes (f) and (a) radii of 1/8 inch to 1 3/32 inches in 3/32 inch steps may be obtained.

Next the manner of obtaining equally spaced parallel lines will be described.

Using the hypotenuse (A') (Fig. 1) as a base for sliding the triangle along a T square or straight edge, parallel lines 1/64 inch apart may be drawn by using three holes (g) to the left of the hole (a) and every other one of the holes (e).

Using the side B' of the triangle as a base and the holes (e) and (a) parallel lines 3/32 inch apart may be obtained. Again using the side A' as a base and the holes in the groups (c) connected by long dash lines and a hole (h) midway the one and two inch graduations of the scale, parallel lines 3/32 inch apart may be obtained; as indicated by the marking "3/32 inch" and arrows pointing to said long dash lines.

Using the lower holes in the groups (d) and the lower holes in the groups (c) connected by the medium length dash lines and the holes in group (c) at the one inch graduation, parallel lines spaced 1/16 inch apart may be obtained. To draw parallel lines 1/8 inch apart the holes in the groups (d) connected by a dot line are used and of course using every other one of these holes will give lines spaced 1/4 inch apart as indicated by the short dash line. A series of holes (i) connected by circular dash lines are also used in conjunction with the above holes for drawing 1/4 inch parallel lines.

The holes in the groups (c) and (d) and the holes (i) connected by solid radial lines are for use in obtaining 1/2 inch spaced parallel lines. The spacing of the holes used for parallel lines is indicated by the appropriate markings and arrows pointing to the guide lines.

The holes in the groups (c) and (d) and the group (f) are also used for making horizontal guide lines for various sizes of upper and lower case letters. For example, the holes in group (c) and the hole (b) at the two inch graduation, the holes in group (d) and a hole (j) just above the two inch graduation are for making parallel guide lines for upper case letters 2/16 of an inch high and correspondingly smaller lower case letters, the guide lines being properly spaced for three rows of letters. Likewise the holes in group (c) and (d), the hole (b) and the hole (j) at the three inch graduation are for making guide lines for letters whose upper case letters are 3/16 inch high. The corresponding holes near graduation four are for 4/16 inch letters and those near graduation five are for 5/16 inch upper case letters and correspondingly smaller lower case letters.

If it is desired to make more than three rows of guide lines, holes (k) located just above the groups (d) near the two, three and four inch graduation are used for making the first line for another set of guide lines, the T square and triangle are then moved upward until the line made with hole (k) above the desired group of holes coincides with the lower hole in the (c) group, three more sets of guide lines may then be made, and so on. If it is desired to make another set of lettering guide lines for 5/16 inch upper case letters the hole (i) connected by a dot and dash line to the hole (j) near the five inch graduation is used for drawing a starting line. Fig. 1 illustrates the use of all the holes in the 5/16 inch group for drawing horizontal guide lines for lettering.

All the holes or apertures used for making lines or used as center holes are countersunk, as indicated in Fig. 3 to facilitate the use of a pencil or sharp pointed instrument therein.

In drawing radial lines, a sharp pointed instrument is placed in the hole to be used as a center (Fig. 3), the point of the instrument being pushed into the drawing board to provide a fulcrum. A sharp pointed pencil is then inserted in the desired hole and while held in contact with the drawing paper is pushed or pulled to rotate the triangle in order to draw the desired radial line. The pencil is similarly used in sliding the triangle along the T square when drawing parallel lines.

The triangle is also provided with a plurality of angular openings, the sides of which are adapted to be used for slant guide lines for lettering for making various angular letters and for drawing geometrical figures. The angles of the sides of these various openings are plainly marked and when in reading position indicate the side of the triangle to be used as a base. Likewise the angular letters that may be drawn with the angular sides of the openings are engraved near the proper side and when in reading position indicate the side of the triangle to be used as a base.

The triangle is also supplied with a protractor scale lying between the groups of radii holes and the angular openings. While eccentric therewith, still the protractor scale is adapted to be used with the vertex of the ninety-degree included angle so that either side of the right angle may be used for drawing angular lines, thus facilitating the use of the protractor to a marked degree.

The protractor scale is graduated in degrees, every ten degree graduation having engraved opposite it the numerals representing the degrees from ten to eighty degrees and from one hundred to one hundred seventy degrees in both directions, the sides of the quadrant representing zero, ninety, or one hundred eighty degrees as desired.

Figs. 1 and 2 also show a scale extending along the hypotenuse A' of the triangle. Such a scale is indispensible to architectural draftsmen and commercial artists and useful as well to mechanical draftsmen.

The scale proper of 5 inches is graduated in sixteenths of an inch, the number of inches being engraved opposite the inch graduation lines. All the graduations and engraving of the scale proper are filled in preferably with black or any other suitable identifying color. At the extreme upper end of the hypotenuse is a linear scale in which 1/8 inch equals one foot divided into sixths or two inch graduations and preferably filled in with green or any other distinguishing color so that it will be readily discernible. Extending downward from the 1/8 scale every fourth 1/8 inch graduation of the scale proper has engraved opposite it its appropriate number in feet filled in with the distinguishing color of the ⅛ inch scale. Likewise at the extreme lower end of the hypotenuse is a scale in which ¼ inch equals one foot divided into inches, every second ¼ inch graduation of the scale proper having engraved opposite it its identifying number in feet. The ¼ inch scale and the identifying numbers are also filled in with a distinguishing color, say, for example, red.

Just below the zero graduation of the scale proper is a linear scale in which one inch equals one foot, graduated in ¼ inches, every third inch graduation having its identifying numeral engraved thereon. Just below the ⅛ inch scale is a scale in which ½ inch equals one foot, graduated in ½ inch steps filled in with a distinguishing color, for instance yellow. Every second ½ inch of the scale proper is designated by the appropriate number in feet which is filled in with the identifying color yellow.

It is readily seen that a scale such as this is susceptible of many uses and of real value when combined with a device such as described hereinbefore.

All the indicia, guide lines, graduations, etc., are engraved on the side of the triangle which is most frequently next to the paper. This prevents the casting of shadows by said indicia and guide lines.

While the form of the article herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In an article of the class described, a body member having a plurality of apertures formed in groups symmetrically spaced with reference to a group of center holes for obtaining various radii, corresponding apertures in each group being also symmetrically spaced with reference to one side of the article for obtaining parallel lines of various determined spacings.

2. In an instrument of the class described, a body member having a plurality of center holes spaced ⅛ inch apart, and a plurality of holes staggered in relation to one another and spaced, from a given center hole, distances differing by $\frac{1}{32}$ inch for use in conjunction with the center holes for obtaining desired radii differing in length by $\frac{1}{32}$ inch.

3. An article of manufacture comprising a plate provided with a group of eight center holes ⅛ inch apart, said plate being further provided with other groups of holes, the corresponding holes in each of the said other groups being one inch apart and being similarly disposed and staggered, as regards the other holes in their groups, the staggered relation of the holes in any one group causing them to be situated, from a given center hole, distances differing by fractions of an inch, whereby desired radii may be obtained within the compass of all the groups.

4. An article of manufacture comprising a plate having a plurality of holes adapted for use as center holes in drawing arcs, said plate being further provided with a plurality of groups of holes adapted to be used in connection with the center holes, corresponding holes in the several groups being spaced the same distance apart, and said corresponding holes in the several groups being unequally spaced in relation to one side of the article, for use in conjunction therewith for drawing parallel lines of various determined spacings.

5. In an instrument of the class described, a plate, an aperture therein adapted for use as a center hole in drawing arcs, and a group of other holes lying each a different distance from the center hole, and adapted for use in connection therewith, the difference in the distances being the same amount, and the holes of said group being so positioned in relation to a side of the plate that they may also be used for drawing guide lines for upper and lower case letters.

JAMES K. BILDER.